(12) United States Patent
Guldenfels

(10) Patent No.: US 6,523,680 B2
(45) Date of Patent: Feb. 25, 2003

(54) RADIUS CONVEYOR BELT WITH STRUCTURE FOR THE PREVENTION OF PINCHED FINGERS

(75) Inventor: Dieter Guldenfels, Pfeffingen (CH)

(73) Assignee: Habasit AG, Reinach (CH)

( * ) Notice: Subject to any disclaimer, the term of this patent is extended or adjusted under 35 U.S.C. 154(b) by 21 days.

(21) Appl. No.: 09/874,589

(22) Filed: Jun. 5, 2001

(65) Prior Publication Data

US 2001/0050214 A1 Dec. 13, 2001

Related U.S. Application Data

(63) Continuation-in-part of application No. 09/579,090, filed on May 25, 2000, now Pat. No. 6,330,941.

(51) Int. Cl.[7] .............................................. B65G 17/06
(52) U.S. Cl. ...................................................... 198/853
(58) Field of Search ................................ 198/850, 852, 198/853

(56) References Cited

U.S. PATENT DOCUMENTS

| | | | |
|---|---|---|---|
| 3,768,631 A | 10/1973 | Wahren | |
| 3,870,141 A | 3/1975 | Lapeyre et al. | |
| 4,394,901 A | 7/1983 | Roinestad | |
| 4,557,374 A | 12/1985 | Bode | |
| D282,907 S | 3/1986 | Schroeder et al. | |
| D286,136 S | 10/1986 | Schroeder et al. | |
| 4,688,670 A | 8/1987 | Lapeyre | |
| 4,742,907 A | 5/1988 | Palmaer | |
| 4,754,872 A | 7/1988 | Damkjaer | |
| 4,832,183 A | 5/1989 | Lapeyre | |
| 4,858,753 A | 8/1989 | Hodlewsky | |
| 4,893,710 A | 1/1990 | Bailey et al. | |
| 4,901,844 A | 2/1990 | Palmaer et al. | |
| D307,707 S | 5/1990 | Abbestam et al. | |
| 4,934,517 A | 6/1990 | Lapeyre | |
| 4,949,838 A | 8/1990 | Lapeyre et al. | |
| 4,972,942 A | 11/1990 | Faulkner | |
| 4,989,723 A | 2/1991 | Bode et al. | |
| 4,993,544 A | 2/1991 | Bailey et al. | |
| 5,031,757 A | 7/1991 | Draebel et al. | |
| 5,065,860 A | 11/1991 | Faulkner | |
| 5,069,330 A | 12/1991 | Palmaer et al. | |
| 5,083,659 A | 1/1992 | Bode et al. | |
| 5,105,938 A | 4/1992 | Tan | |
| 5,133,449 A | 7/1992 | Spangler | |
| 5,139,135 A | 8/1992 | Irwin et al. | |
| 5,156,264 A | 10/1992 | Lapeyre | |

(List continued on next page.)

FOREIGN PATENT DOCUMENTS

| | | |
|---|---|---|
| EP | 0521506 | 1/1993 |
| EP | 0567337 | 10/1993 |
| EP | 0739830 | 10/1996 |
| WO | WO 95/05986 | 3/1995 |

*Primary Examiner*—James R. Bidwell
(74) *Attorney, Agent, or Firm*—McKenna Long & Aldridge LLP (57) ABSTRACT

A modular conveyor belt formed of rows of belt modules pivotally interlinked by transverse pivot rods and specially adapted for following a curved conveyor path. The modules include a top, product conveying surface and a bottom, sprocket-driven surface. The belt modules have a plurality of first link ends disposed in the direction of travel of the conveyor belt and a plurality of second link ends disposed in the opposite direction. Transverse holes in the link ends are aligned to accommodate a pivot rod. When the link ends of the consecutive rows of side by side modules are intercalated, the pivot rod serves as a hinge pin in a hinged joint between consecutive interlinked rows. To permit the belt to flex sidewise, the openings in the first link ends are slotted longitudinally in the direction of belt travel. In order to prevent fingers from penetrating the grid, the belt modules have a cross-rib with an extended portion in the longitudinal direction designed so as to allow the link ends to undercut the cross-rib when collapsing and to reduce the gap between adjacent modules.

14 Claims, 8 Drawing Sheets

U.S. PATENT DOCUMENTS

| | | |
|---|---|---|
| 5,181,601 A | 1/1993 | Palmaer et al. |
| 5,217,110 A | 6/1993 | Spangler et al. |
| 5,224,583 A | 7/1993 | Palmaer et al. |
| 5,253,749 A | 10/1993 | Ensch |
| 5,271,491 A | 12/1993 | Irwin |
| 5,280,833 A | 1/1994 | Robin |
| 5,303,818 A | 4/1994 | Gruettner et al. |
| 5,310,045 A | 5/1994 | Palmaer et al. |
| 5,310,046 A | 5/1994 | Palmaer et al. |
| 5,332,084 A | 7/1994 | Greve |
| 5,372,248 A | 12/1994 | Horton |
| 5,419,428 A | 5/1995 | Palmaer et al. |
| 5,425,443 A | 6/1995 | van Zijderveld et al. |
| 5,431,275 A | 7/1995 | Faulkner |
| 5,439,099 A | 8/1995 | Bos et al. |
| 5,547,071 A | 8/1996 | Palmaer et al. |
| 5,562,200 A | 10/1996 | Daringer |
| 5,566,817 A | 10/1996 | Meeker |
| 5,573,105 A | 11/1996 | Palmaer |
| 5,598,916 A | 2/1997 | Horton et al. |
| 5,613,597 A | 3/1997 | Palmaer et al. |
| 5,628,393 A | 5/1997 | Steeber et al. |
| 5,645,160 A | 7/1997 | Palmaer et al. |
| 5,690,210 A | 11/1997 | Layne |
| 5,738,205 A | 4/1998 | Draebel |
| 5,906,270 A | 5/1999 | Faulkner |
| 5,911,305 A | 6/1999 | Layne |
| 5,921,379 A | 7/1999 | Horton |
| 6,330,941 B1 * | 12/2001 | Guldenfels .................. 198/853 |
| 6,357,581 B1 * | 3/2002 | Guldenfels .................. 198/853 |

* cited by examiner

RADIUS CONVEYOR BELT WITH STRUCTURE FOR THE PREVENTION OF PINCHED FINGERS

CROSS-REFERENCE TO RELATED APPLICATION

The present application is a continuation-in-part application claiming priority to U.S. patent application Ser. No. 09/579,090 filed May 25, 2000, now U.S. Pat. No. 6,330,941 and entitled "Radius Conveyor Belt", which is incorporated herein by reference.

FIELD OF INVENTION

This invention relates to conveyor belts and, more particularly, to modular plastic conveyor belts formed of rows of plastic belt modules pivotally interlinked by transverse pivot rods.

BACKGROUND OF THE INVENTION

Because they do not corrode, are light weight, and are easy to clean, unlike metal conveyor belts, plastic conveyor belts are used widely, especially in conveying food products. Modular plastic conveyor belts are made up of molded plastic modular links, or belt modules, that can be arranged side by side in rows of selectable width. A series of spaced apart link ends extending from each side of the modules include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are connected together to form an endless conveyor belt capable of articulating about a drive sprocket.

In many industrial applications, conveyor belts are used to carry products along paths including curved segments. Belts capable of flexing sidewise to follow curved paths are referred to as side-flexing, turn, or radius belts. As a radius belt negotiates a turn, the belt must be able to fan out because the edge of the belt at the outside of the turn follows a longer path than the edge at the inside of the turn. In order to fan out, a modular plastic radius belt typically has provisions that allow it to collapse at the inside of a turn or to spread out at the outside of the turn.

Apertures slotted in the direction of travel of the belt are commonly provided in the link ends on at least one side of the modules to facilitate the collapsing and spreading of the belt.

In applications where greater strength is required radius belts with a larger pitch are required. These radius belts with a large pitch ($\geq 1.5"$) have suffered from the disadvantage that, due to the larger pitch and the need to be collapsible, the grid openings were large enough to allow the finger of operators to penetrate the grid. This situation may lead to injuries.

What is needed is a modular radius conveyor belt that has a large pitch yet reduces the gap between the links to less than 10 mm to prevent fingers from penetrating the grid.

SUMMARY OF THE INVENTION

The present invention meets the above-described need by providing a radius belt having belt modules with a cross-rib designed so as to allow the link ends to undercut the cross-rib when collapsing. The module has a cross-rib with an extended portion in the longitudinal direction. The modules include first and second module surfaces, i.e., a top, product-conveying surface and a bottom, sprocket-driven surface. A cross-rib extends across the width of each module transverse to the direction of belt travel. The cross-rib is formed in part by a web and in part by a thin, corrugated strip having a pair of essentially parallel walls. The corrugated strip forms a series of regularly spaced alternating ridges and valleys along each wall. Link ends extend outward from the ridges on each wall of the corrugated strip. Each link end has a leg portion attached at a ridge of the strip and a thick distal portion at the end of the link end distant from the corrugated strip. Transverse holes in the link ends extending from respective walls of a module are aligned to accommodate a pivot rod. When the link ends of consecutive rows of side-by-side modules are intercalated, the pivot rod serves as a hinge pin in a hinged joint between consecutive interlinked rows. To permit the belt to follow a curved path, the pivot rod openings in at least one of the link ends extending from one of the walls of the corrugated strip are slotted longitudinally in the direction of belt travel.

The belt is driven by engagement of the sprocket tooth with the curved outside surface of the link ends. The link end engaged by the sprocket tooth is subjected to a compressive force rather than an undesirable tensile force. Thus, the link ends provide pull strength, resistance to belt and sprocket wear, and sprocket drivability. As an alternative, a central portion of a link end disposed in the middle belt modules may also engage with a tooth on the drive sprocket. Because the mid modules do not have to collapse fully, they may be formed with a thicker and fully straight cross-rib.

Each wall of the corrugated strip forms a series of arched recesses with the leg portions of the link ends. The recesses are large enough to provide room for a thick link end of an interlinked module of an adjacent row to collapse into the recess or to rotate as belt rows fan out going around a turn. Because the recesses along one wall overlap in a transverse direction with the recesses along the other wall, additional space for collapsing is provided.

BRIEF DESCRIPTION OF THE DRAWINGS

The invention is illustrated in the drawings in which like reference characters designate the same or similar parts throughout the figures of which.

DETAILED DESCRIPTION OF THE PREFERRED EMBODIMENTS

Referring now to the drawings, FIGS. 1 to 9 show a first embodiment of a modular belt 20 of the present invention.

Figure 7:
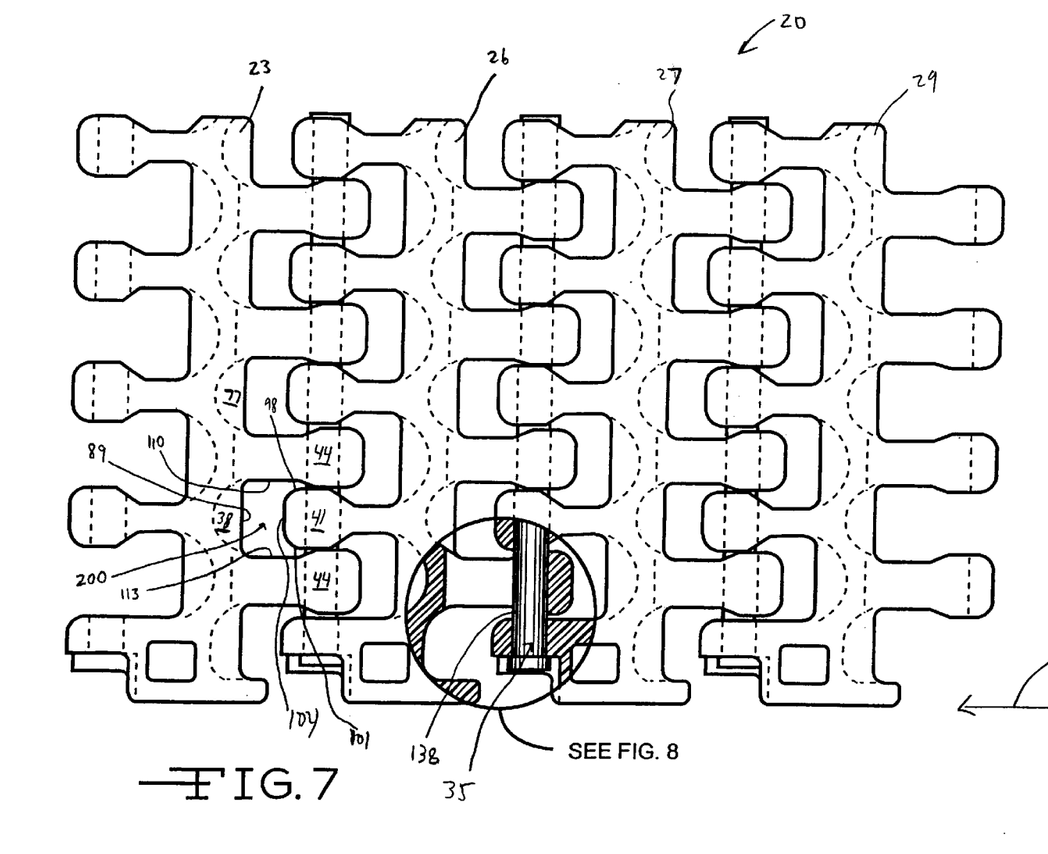
FIG. 7 is a top plan view of a radius belt of the present invention.
Figure 8:
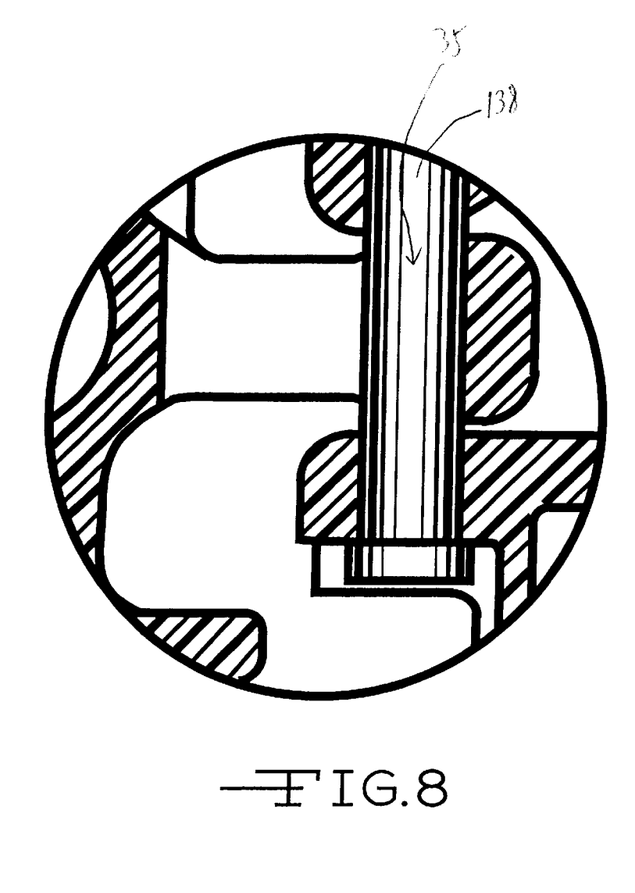
FIG. 8 is a partial detailed view of a section of the belt of FIG. 7.

The portion of the modular belt 20 shown is formed from molded plastic modules 23, 26, 27 and 29 (FIG. 7). For reference, the direction of belt travel is indicated by arrow 32, however, the belt of the present invention may be conveyed in either direction. A pivot rod 35 (FIG. 7) connects adjacent belt modules by passing through openings in the modules disposed transverse to the direction of belt travel.

Figure 1:
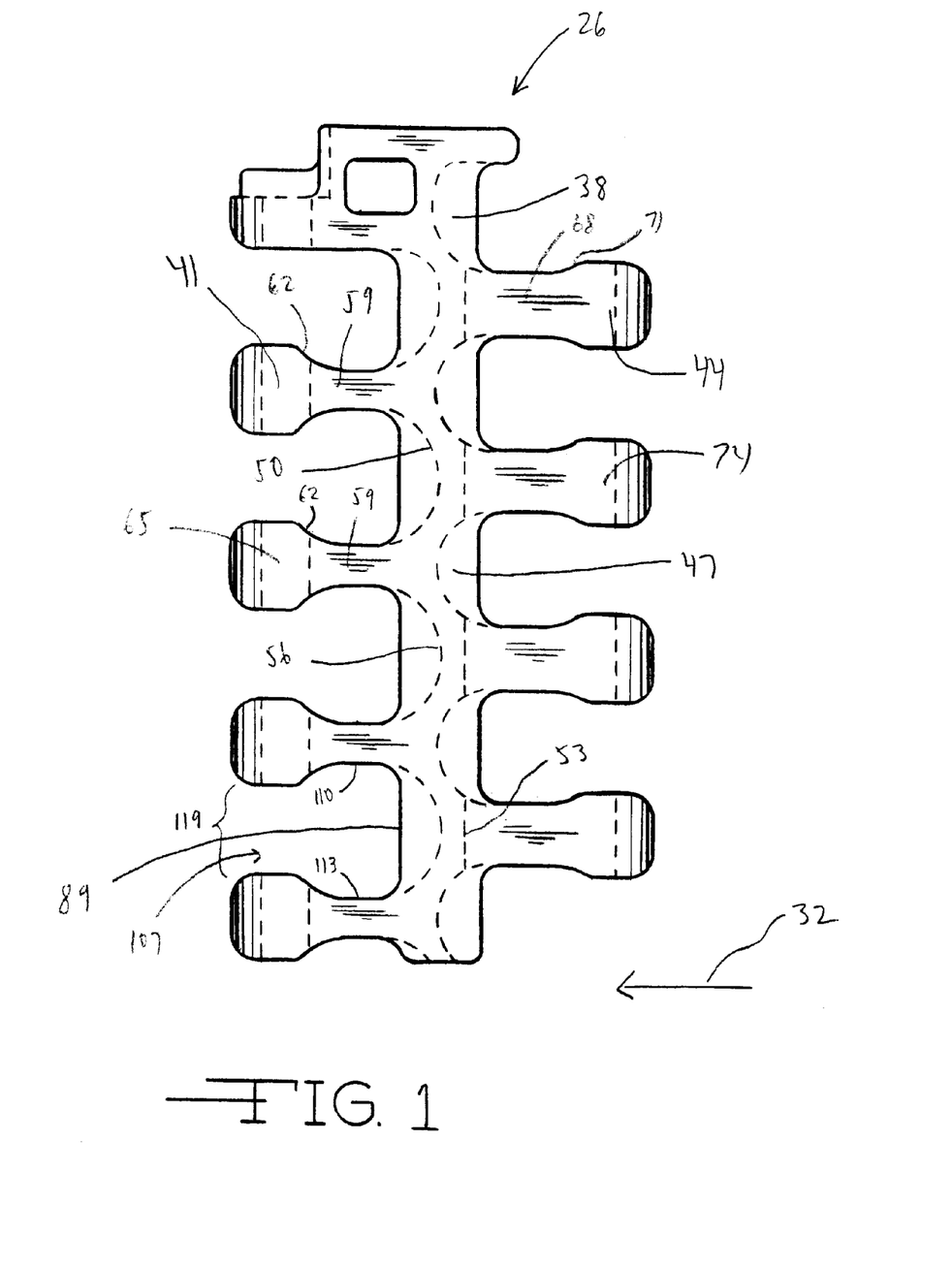
FIG. 1 is a top plan view of a radius conveyor belt module of the present invention.

As shown in FIG. 1, an exemplary one of the belt module 26 has a cross-rib 38 supporting a plurality of first link ends 41 and a plurality of second link ends 44. The first link ends 41 are disposed in the direction of belt travel indicated by arrow 32 and the plurality of second link ends 44 extend opposite the first link ends 41. As will be described in detail hereinafter, the cross-rib 38 is comprised of an upper, transverse stiffening web 47 forming into a lower corrugated portion 50 (shown in broken lines in FIG. 1). The corrugated portion 50 forms a series of ridges 53 and valleys 56 in a sinusoidal manner. Along with the transverse web 47 of the cross-rib 38, the ridges 53 extending toward the right of FIG. 2 support the first link ends 41 while the ridges 53 extending toward the left in the drawing support the second link ends 44.

The first link ends 41 include a leg portion 59 connected through an angled portion 62 to a distal head portion 65. In a similar manner, the second link ends 44 include a leg portion 68 connected through an angled portion 71 to a distal head portion 74.

Figure 2:
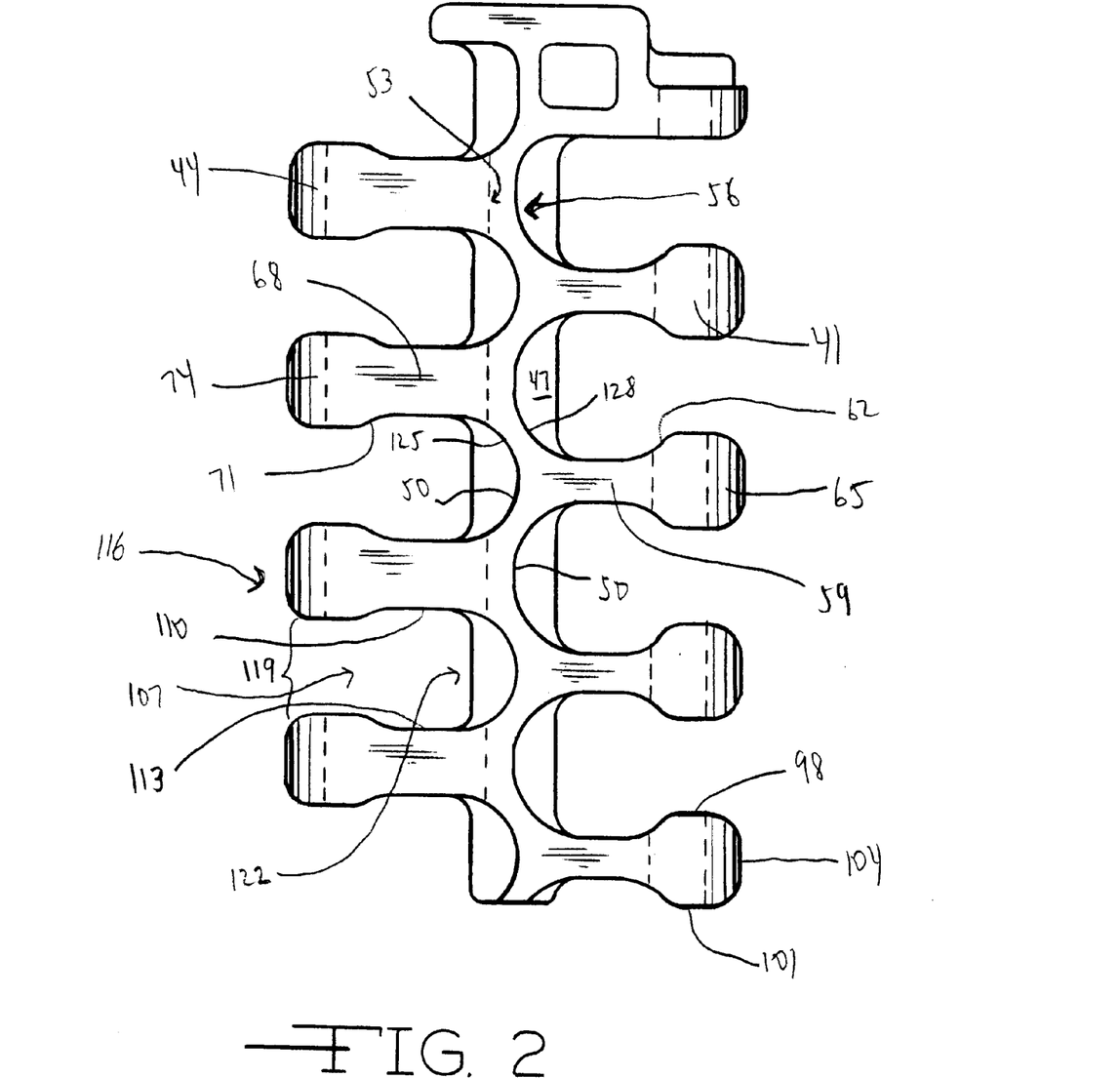
FIG. 2 is a bottom plan view of the belt module of the present invention.
Figure 3:
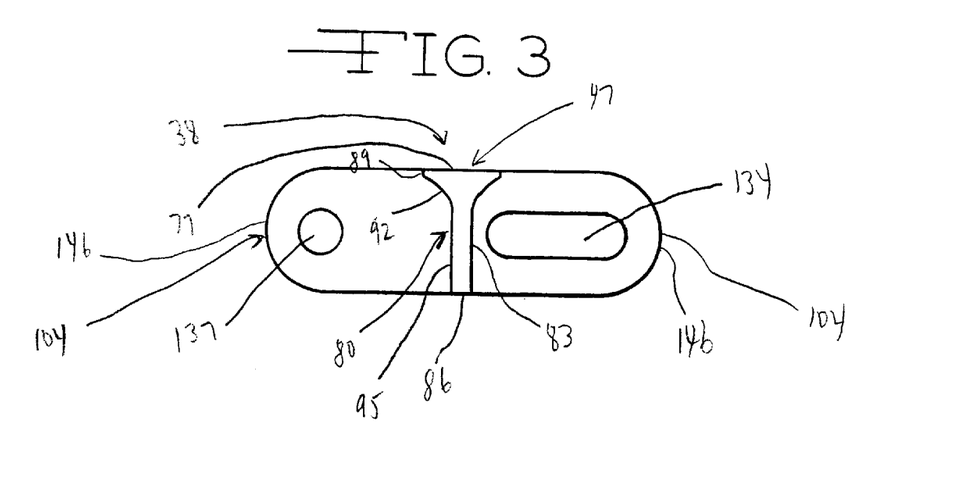
FIG. 3 is an end elevation view of the belt module of the present invention.

With respect to the orientation shown in FIG. 3, the cross-rib 38, which is formed of the stiffening web 47 and the corrugated portion 50 (FIG. 2), is comprised of an upper surface 77 extending to and meeting with opposed left and right walls 80 and 83 which, in turn, meet with a lower surface 86 of the module. The left wall 80 is comprised of an upper wall 89, which is part of the stiffening web 47, and extends downwardly to a curved wall 92 which forms into a lower vertical wall 95. The curved wall 92 and the lower vertical wall 95 are part of the corrugated portion 50 of the cross-rib 38. The lower vertical wall 95 extends to the lower surface 86 of the module which, in turn, extends to and meets with the right vertical wall 83.

As shown in FIG. 2, the head portion 65 is preferably larger than the leg portion 59. Accordingly, the head portion 65 is connected to the leg portion 59 by the angled portion 62. The head portion 65 is preferably formed with two substantially parallel sides 98 and 101 connected by an outer end 104. The corners between the sides 98, 101 and ends 104 are preferably radiused to be smooth and to protect the conveyed product from damage.

An opening 107 is defined between spaced apart sides 110, 113 of adjacent link ends. At a distal end 116, the ends of adjacent links form the mouth 119 of the opening 107. At the opposite end 122, the opening 107 terminates in the multi-level surface defined by the web 47 and corrugated portion 50 as described above. The top level of the surface (best shown in FIG. 1) is defined by wall 89 (FIG. 3) of the web 47. The corners where the side walls of the link ends 41 meet the straight wall 89 of web 47, are also radiused to be smooth and to protect the conveyed product from damage.

In FIG. 2, the bottom level of the surface of cross-rib 38 is defined by the relatively thin corrugated portion 50 having a pair of essentially parallel walls 125, 128. The corrugated portion 50 forms the series of regularly spaced alternating ridges 53 and valleys 56 along the cross-rib 38 as described herein.

Returning to FIG. 1, the straight wall 89 is shown bordering the opening 107. The curved surface defined by corrugated portion 50 is shown in broken lines. The curved surface receives link ends from an adjacent belt module such that the belt 20 is capable of collapsing for movement around a curved path as described in detail herein.

The plurality of second link ends 44 extend from the belt module 26 in the opposite direction from the first link ends 41. The second link ends 44 have the same overall shape as the first link ends 41 and are designed to fit into the openings between the first link ends 41 such that adjacent belt modules can be intercalated and pivotally connected by the pivot rods 35.

As shown in FIG. 3, the belt module 26 includes a slot 134 that is disposed through the link ends 41 transverse to the direction of belt travel. The slot 134 extends in the direction of belt travel such that it is generally oblong. The slot 134 receives the pivot rod 35. The pivot rod 35 passes through the slots 134, in the first link ends 41 and through the openings 137 in the second link ends 44 (as shown in FIG. 7). The openings 137 correspond to the shape of the shaft 138 (FIG. 7) of the pivot rod 35 such that the pivot rod 35 is received through the opening 137 but in contrast to slot 134, the pivot rod 35 preferably cannot move in the direction of belt travel inside opening 137. Due to the oblong shape of slot 134, the pivot rod 35 can pivot inside the slot 134 such that the belt 20 is capable of collapsing on one side while the other side fans out due to the pivoting of rod 35 and the nesting of the link ends 41, 44 and cooperating spaces in the adjacent belt modules.

Figure 4:
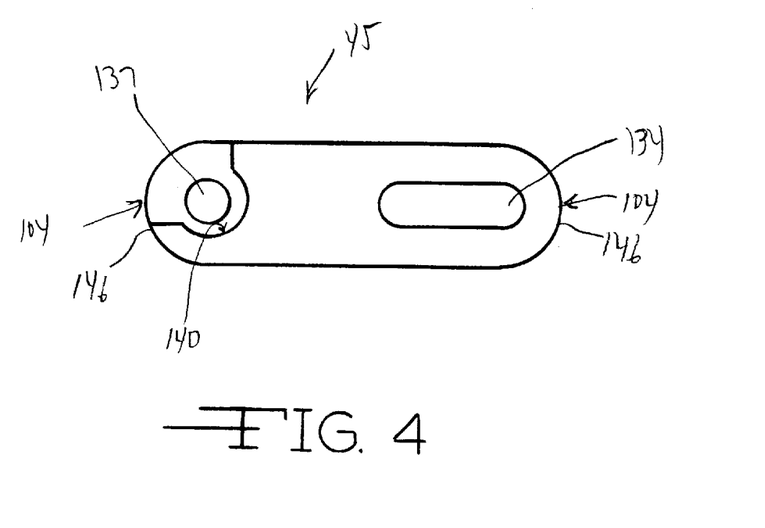
FIG. 4 is an end elevation view of the belt module of the present invention.

In FIG. 4, the last link end 45 of the belt module 26 includes a second opening 140 disposed around opening 137 to provide for countersinking a head (not shown) at the end of the pivot rod shaft 138.

Figure 5:
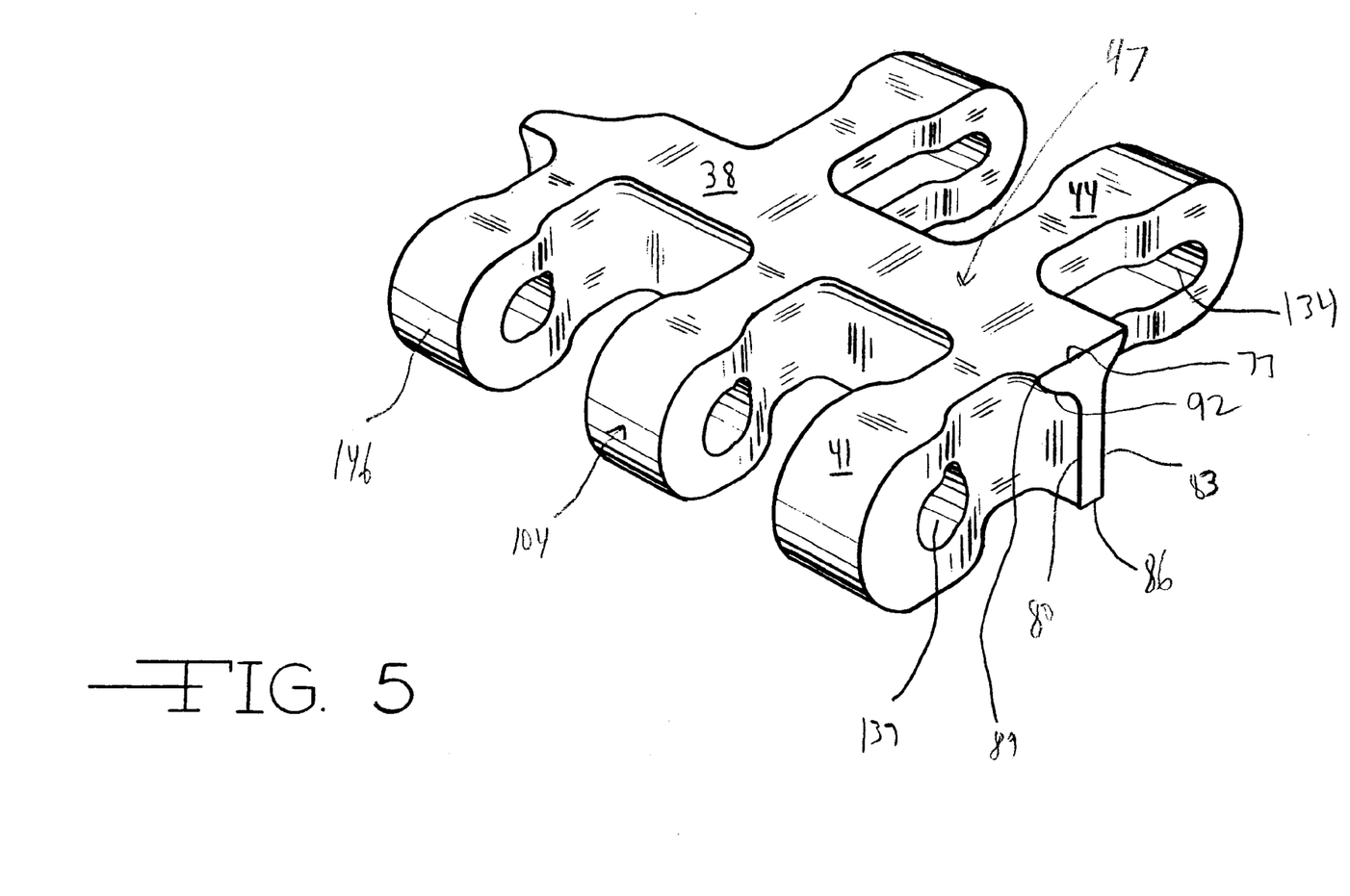
FIG. 5 is a top perspective view of the belt module of the present invention.
Figure 6:
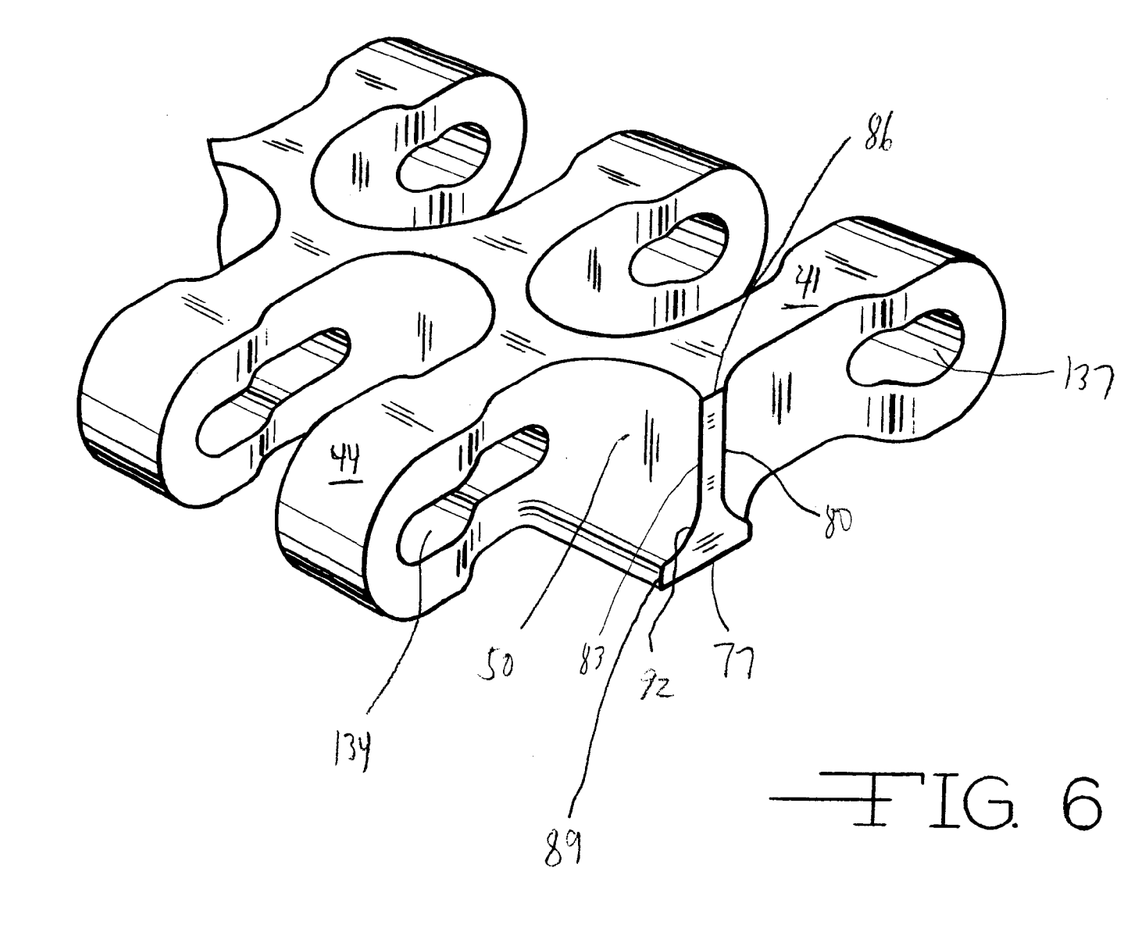
FIG. 6 is a bottom perspective view of the belt module of the present invention.

The transverse slot 134 in link ends 41 and the transverse opening 137 in link ends 44 receive pivot rods 35 to connect adjacent belt modules 23 and 29 as shown in FIG. 7. As shown in FIG. 5, the web 47 is coterminous with the top surface 77 of the belt module 26 and terminates at the top of the corrugated portion 50 that defines the space between adjacent link ends (best shown in FIG. 6).

The outer ends 104 of the link ends 41 and 44 are radiused in a smooth rounded surface 146. The rounded surface 146 preferably comprises a rounded surface having a constant radius and provides a driving surface for engagement with the drive sprocket 149 as described herein.

Also, the curvature of the outer ends 104 of the link ends enables the links to clear the web 47 when the adjacent modules collapse along the edge. The clearance enables the link ends to extend under the web 47 into the space defined by the corrugated portion 50 (best shown in FIGS. 5–6). In this manner, the web 47 partially hoods the link ends when the belt 20 collapses. Accordingly, the belt module 26 provides a web 47 for structural stability while maintaining a corrugated portion 50 to allow for recesses that provide maximum space for collapsing the belt modules around a curved path.

In FIG. 7, the belt 20 is shown at its maximum lengthwise extension. For example, the maximum lengthwise extension creates spaces 200 bordered by the cross-rib 38, the link ends 44 of module 23 and the link ends 41 of the adjacent module. In order to prevent small fingers from penetrating the belt grid and engaging with a belt support 205 (FIG. 9), the top surface 77 of the cross-rib is extended such that the opening 200 described above is less than 10 mm. At the top conveying surface, the opening 200 is bordered on one side by upper wall 89. The space 200 is also bordered by sides 110, 113, of adjacent link ends 44. The end of space 200 opposite from upper wall 89 is defined by the outer end 104 of link end 41 on the. adjacent belt module 26. Also, a portion of the sides 98 and 101 of link end 41 border space 200.

For belts having a pitch greater than or equal to 1.5 inches, the openings created in the belt grid may allow for fingers to penetrate the grid.

In the present invention, for belts having pitches greater than or equal to 1.5 inches, extending the upper wall 89 outward from the cross-rib 38 reduces the size of space 200. The upper wall 89 is sized so that when the belt 20 is fully extended lengthwise the space 200 has critical opening widths or diameter less than 10 mm. Critical opening width or diameter is defined as the distance of the opening across its smallest dimension.

The extended upper wall 89 is sized to reduce the size of the opening yet allows the belt 20 to collapse without obstruction. The curvature of the link end from the top surface provides for nesting of the link end beneath the upper wall 89.

Figure 9:
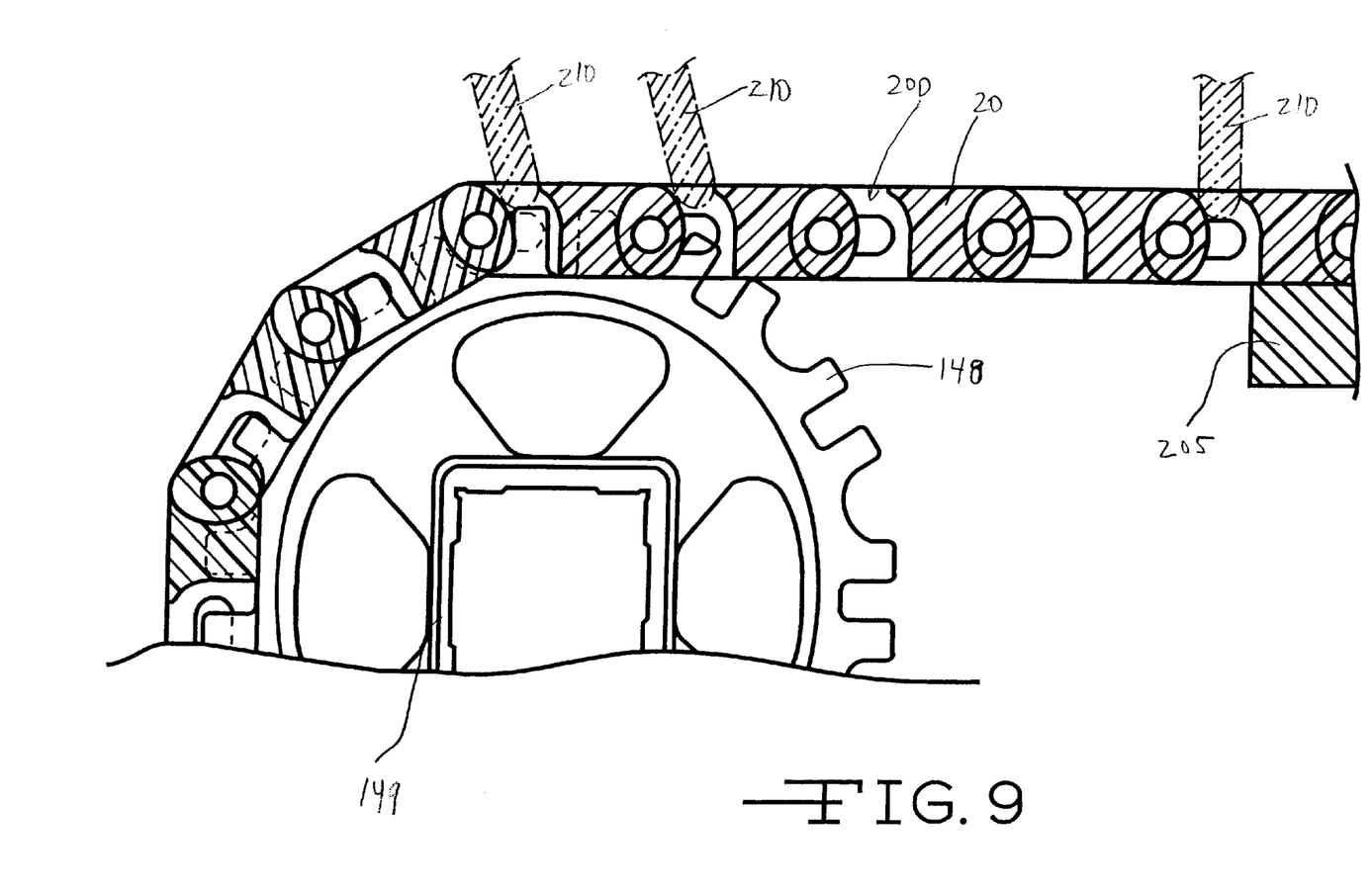
FIG. 9 is a side elevational view of a belt of the present invention engaged with a sprocket and illustrating the gaps between adjacent modules.

In FIG. 9, the belt modules 20 are shown driven by the teeth 148 on the drive sprocket 149. The drive sprocket 149 is driven by a rotating shaft (not shown) as known to those of ordinary skill in the art. A cylindrical member 210, which is representative of a small finger, has a diameter of 10 mm. As shown, the space 200 is not large enough to accommodate the member 210.

Accordingly, a radius belt 20 suitable for larger pitch (≧1.5") radius belt applications has been disclosed. The belt 20 has an extended cross-rib 38 that reduces the space 200 to less than 10 mm width so as to prevent fingers of a user from penetrating the belt grid.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A radius conveyor belt, comprising:
   a plurality of belt modules having a plurality of first link ends disposed in the direction of belt travel and having a plurality of second link ends disposed in the opposite direction, a cross-rib disposed between the first and second link ends and having a web, and a corrugated portion disposed adjacent to the web, the first and second link ends disposed such that a space capable of receiving a link end is formed between each adjacent link end, the space being open at one end and terminating in an rounded region at the opposite end, the plurality of first link ends being offset from the plurality of second link ends such that the first link ends align with the space between the second link ends such that adjacently positioned belt modules are capable of intercalating so that the first link ends of one belt module fit into the spaces defined between the second link ends of an adjacent belt module, the plurality of first link ends having a slot defined therein, the slot disposed transverse to the direction of belt travel and extending in the direction of belt travel, the plurality of second link ends having a transverse opening defined therein;
   a pivot rod extending transverse to the direction of belt travel through the openings in the second link end of one of the plurality of belt modules and extending through the slotted openings in the first link end of an adjacent belt module such that the first and second link ends of the adjacent belt modules are intercalated and the adjacent belt modules are interlinked into adjacent hinged rows capable of following a curved path;
   wherein the web on the cross-rib extends in the direction of belt travel such that, when the belt is at its maximum extension in the direction of belt travel, a space bounded by the web, an outer end of the first link end and the sidewalls of second links ends has a diameter less than 10 mm.

2. The radius conveyor belt of claim 1, wherein the first and second link ends each have a leg portion with substantially parallel sidewalls.

3. The radius conveyor belt of claim 2, wherein the first and second link ends each have a head portion that is wider than the leg portion, the head portion having a pair of substantially parallel sidewalls and an endwall.

4. The radius conveyor belt of claim 3, wherein a junction of the sidewalls and endwall of the head portion is rounded.

5. The radius conveyor belt of claim 3, wherein the endwall of the head portion is rounded and connects a top surface of the link end to a bottom surface of the link end.

6. The radius conveyor belt of claim 1, further comprising an opening disposed through the belt module from the top surface to the bottom surface.

7. The radius conveyor belt of claim 1, wherein the web and corrugated portion form a multilevel surface defining the end of the space between adjacent link ends.

8. A conveying system, comprising:
   an endless radius conveyor belt, comprising a plurality of belt modules having a plurality of first link ends disposed in the direction of belt travel and having a plurality of second link ends disposed in the opposite direction, the first and second link ends disposed such that a space capable of receiving a link end is formed between each adjacent link end, the space being open at one end and terminating in an rounded region at the opposite end, the plurality of first link ends being offset from the plurality of second link ends such that the first link ends align with the space between the second link ends such that adjacently positioned belt modules are capable of intercalating so that the first link ends of one belt module fit into the spaces defined between the second link ends of an adjacent belt module, the plurality of first link ends having a slot defined therein, the slot disposed transverse to the direction of belt travel and extending in the direction of belt travel, the plurality of second link ends having a transverse opening defined therein;
   an intermediate portion disposed between the first and second link ends and having a web and a corrugated portion, the web formed in the center of the belt modules and disposed such that a first side of the web terminates in a first surface of the belt module and a second side of the web terminates adjacent to the corrugated portion, wherein the web on the intermediate portion extends in the direction of belt travel such that, when the belt is at its maximum extension in the direction of belt travel, a space bounded by the web, an outer end of the first link end and the sidewalls of second links ends has a diameter less than 10 mm;
   a pivot rod extending transverse to the direction of belt travel through the openings in the second link end of one of the plurality of belt modules and extending through the slotted openings in the first link end of an adjacent belt module such that the first and second link ends of the adjacent belt modules are intercalated and the adjacent belt modules are interlinked into adjacent hinged rows capable of following a curved path; and, a drive sprocket having teeth disposed around the perimeter thereof, the teeth capable of engaging with the rounded endwall of the link ends to drive the endless conveyor belt around a conveying path; and, wherein the web and corrugated portion form a multilevel surface defining the end of the space between adjacent link ends.

9. The conveying system of claim 8, wherein the first and second link ends each have a leg portion with substantially parallel sidewalls.

10. The conveying system of claim 9, wherein the first and second link ends each have a head portion that is wider than the leg portion, the head portion having a pair of substantially parallel sidewalls and an endwall.

11. The conveying system of claim 10, wherein a junction of the sidewalls and endwall of the head portion is rounded.

12. The conveying system of claim 10, wherein the endwall of the head portion is rounded and connects a top surface of the link end to a bottom surface of the link end.

13. The conveying system of claim 8, further comprising an opening disposed through the belt module from the top surface to the bottom surface.

14. The conveying system of claim 8, wherein the web and rounded regions form a multilevel surface defining the end of the space between adjacent link ends.

* * * * *

(12) INTER PARTES REEXAMINATION CERTIFICATE (588th)
United States Patent
Guldenfels (10) Number: US 6,523,680 C1
(45) Certificate Issued: Apr. 30, 2013

(54) RADIUS CONVEYOR BELT WITH STRUCTURE FOR THE PREVENTION OF PINCHED FINGERS

(75) Inventor: Dieter Guldenfels, Pfeffingen (CH)

(73) Assignee: Habasit Belting, Incorporation, Suwanee, GA (US)

Reexamination Request:
No. 95/000,072, Jan. 26, 2005

Reexamination Certificate for:
Patent No.: 6,523,680
Issued: Feb. 25, 2003
Appl. No.: 09/874,589
Filed: Jun. 5, 2001

Related U.S. Application Data

(63) Continuation-in-part of application No. 09/579,090, filed on May 25, 2000, now Pat. No. 6,330,941.

(51) Int. Cl.
*B65G 17/38* (2006.01)
*B65G 17/06* (2006.01)

(52) U.S. Cl.
USPC .......................................................... 198/853

(58) Field of Classification Search
None
See application file for complete search history.

(56) References Cited

To view the complete listing of prior art documents cited during the proceeding for Reexamination Control Number 95/000,072, please refer to the USPTO's public Patent Application Information Retrieval (PAIR) system under the Display References tab.

*Primary Examiner* — Beverly M. Flanagan (57) ABSTRACT

A modular conveyor belt formed of rows of belt modules pivotally interlinked by transverse pivot rods and specially adapted for following a curved conveyor path. The modules include a top, product conveying surface and a bottom, sprocket-driven surface. The belt modules have a plurality of first link ends disposed in the direction of travel of the conveyor belt and a plurality of second link ends disposed in the opposite direction. Transverse holes in the link ends are aligned to accommodate a pivot rod. When the link ends of the consecutive rows of side by side modules are intercalated, the pivot rod serves as a hinge pin in a hinged joint between consecutive interlinked rows. To permit the belt to flex sidewise, the openings in the first link ends are slotted longitudinally in the direction of belt travel. In order to prevent fingers from penetrating the grid, the belt modules have a cross-rib with an extended portion in the longitudinal direction designed so as to allow the link ends to undercut the cross-rib when collapsing and to reduce the gap between adjacent modules.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-14 are cancelled.

* * * * *